United States Patent
Yu et al.

(10) Patent No.: US 11,597,627 B2
(45) Date of Patent: Mar. 7, 2023

(54) WIRE RETRACTING DEVICE

(71) Applicant: USI Science and Technology (Shenzhen) Co., Ltd., Shenzhen (CN)

(72) Inventors: Yun-Kai Yu, Shenzhen (CN); Chang-Cheng Lin, Shenzhen (CN); Kuo-Kuang Liu, Shenzhen (CN); Der-Jiuh Jan, Shenzhen (CN)

(73) Assignee: USI Science and Technology (Shenzhen) Co., Ltd., Shenzhen (CN)

( * ) Notice: Subject to any disclaimer, the term of this patent is extended or adjusted under 35 U.S.C. 154(b) by 230 days.

(21) Appl. No.: 17/231,002

(22) Filed: Apr. 15, 2021

(65) Prior Publication Data

US 2022/0162037 A1    May 26, 2022

(30) Foreign Application Priority Data

Nov. 24, 2020   (CN) .......................... 202011329889.X (51) Int. Cl.
*B65H 75/48*   (2006.01)
*B65H 75/44*   (2006.01)
*H02G 11/00*   (2006.01)

(52) U.S. Cl.
CPC ..... *B65H 75/4471* (2013.01); *B65H 75/4402* (2013.01); *H02G 11/00* (2013.01); *B65H 2701/34* (2013.01)

(58) Field of Classification Search
CPC .............. B65H 75/406; B65H 75/4402; B65H 75/4428; B65H 75/4471; H02G 11/00
See application file for complete search history.

(56) References Cited

U.S. PATENT DOCUMENTS

| | | | | |
|---|---|---|---|---|
| 8,136,751 | B2 * | 3/2012 | Chen ...................... | H02G 11/02 242/378.1 |
| 9,072,341 | B2 * | 7/2015 | Jungkind .............. | A43C 11/165 |
| 10,899,577 | B2 * | 1/2021 | Ji .......................... | B65H 75/486 |
| 2007/0001046 | A1 * | 1/2007 | Wu ..................... | B65H 75/4434 242/378.1 |
| 2008/0111014 | A1 * | 5/2008 | Wu .................... | B65H 75/4402 242/397 |

FOREIGN PATENT DOCUMENTS

| | | |
|---|---|---|
| CN | 105762588 A | 7/2016 |
| CN | 206574916 U | 10/2017 |
| CN | 209692084 U | 11/2019 |
| CN | 111573434 A | 8/2020 |

\* cited by examiner

*Primary Examiner* — Sang K Kim
(74) *Attorney, Agent, or Firm* — Li & Cai Intellectual Property Office (57) ABSTRACT

A wire retracting device includes a base having a platform, a limiting board disposed on the base, a cover including a top surface and a side wall, a slide block slidably disposed on a sliding area, and a transmission wire disposed in an accommodating space formed between the cover and the base. An annular wall is arranged on the platform, and has a limiting portion that has a first stop portion and a second stop portion respectively formed on two sides thereof. A gap, in which the cover is limited to being movable, is formed between the limiting board and the platform. The top surface has a grooved opening, and a lever is arranged on an inner edge thereof. The side wall is disposed along an edge of the top surface. The sliding area is formed between the inner edge of the grooved opening and the annular wall.

10 Claims, 13 Drawing Sheets

WIRE RETRACTING DEVICE

CROSS-REFERENCE TO RELATED PATENT APPLICATION

This application claims the benefit of priority to China Patent Application No. 202011329889.X, filed on Nov. 24, 2020 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wire retracting device, and more particularly to a wire retracting device having stop portions.

BACKGROUND OF THE DISCLOSURE

A portable adapter is a docking station designed for laptop computers, which allows a laptop computer to be connected to peripheral equipment, e.g., a power adapter, an internet cable, a mouse, a peripheral keyboard, a printer, and a peripheral monitor via a single connection point. The portable adaptor, in addition to having a plurality of connecting ports, usually has a transmission wire that is used for connecting peripheral electronic devices.

When a wire is received inside a conventional portable adaptor, the wire can usually be wound one turn only. When the wire is wound more than one turn, a user may not know whether or not the wire is completely retracted and continue to wind the wire, thereby causing the wire to be over-wound and damaged. However, when the wire can only be wound one turn or less than one turn, a length of the wire is consequently limited (since accommodating a wire that is too long is not possible, and the wire can only be kept at a length that is fitting for accommodation and for being wound one turn).

Therefore, it has become an important issue in the industry to allow the user to be aware that the wire has been completely retracted when the wire is being wound more than one turn.

SUMMARY OF THE DISCLOSURE

In response to the above-referenced technical inadequacies, the present disclosure provides a wire retracting device.

In one aspect, the present disclosure provides a wire retracting device including a base, a limiting board, a cover, a slide block, and a transmission wire. The base includes a platform, and an annular wall is arranged on the platform. The annular wall has a limiting portion, and a first stop portion and a second stop portion are formed on two sides of the limiting portion, respectively. The limiting board is disposed on the base, and a gap is formed between the limiting board and the platform. The cover is limited to being movable in the gap, and an accommodating space is formed between the cover and the base. The cover includes a top surface and a side wall. The top surface has a grooved opening, and a lever is arranged on an inner edge of the grooved opening. The side wall is disposed along an edge of the top surface and forms an opening, and a sliding area is formed between the inner edge of the grooved opening and the annular wall. The slide block is slidably disposed on the sliding area. The slide block includes a first recess portion and a second recess portion, the first recess portion and the second recess portion are disposed symmetrically, and the lever is detachably engaged with the first recess portion and the second recess portion. The transmission wire is disposed in the accommodating space, and the transmission wire is capable of being retracted in and being released out through the opening.

Therefore, one of the beneficial effects of the wire retracting device of the present disclosure is that, by virtue of "the wire retracting device including the base, the limiting board, the cover, the slide block, and the transmission wire", "the base including the platform, the annular wall being arranged on the platform, the annular wall having the limiting portion, and the first stop portion and the second stop portion being formed on two sides of the limiting portion, respectively", "the limiting board being disposed on the base, the gap being formed between the limiting board and the platform, the cover being limited to being movable in the gap, and the accommodating space being formed between the cover and the base", "the cover including the top surface and the side wall, the top surface having the grooved opening, the lever being arranged on the inner edge of the grooved opening, and the side wall being disposed along the edge of the top surface and forming the opening", "the sliding area being formed between the inner edge of the grooved opening and the annular wall", "the slide block being slidably disposed on the sliding area, the slide block including the first recess portion and the second recess portion, the first recess portion and the second recess portion being disposed symmetrically, and the lever being detachably engaged with the first recess portion and the second recess portion", "the limiting board being disposed on the grooved opening and affixed on the annular wall of the platform", and "the transmission wire being disposed in the accommodating space, and the transmission wire being capable of being retracted in and being released out through the opening", a retractable length of the transmission wire can be increased, and a user is able to be aware that the retracting movement has been completed when a wire (i.e., the transmission wire) is wound for more than one turn. In this way, the wire can be prevented from being damaged due to being over-wound.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiment

Figure 1:
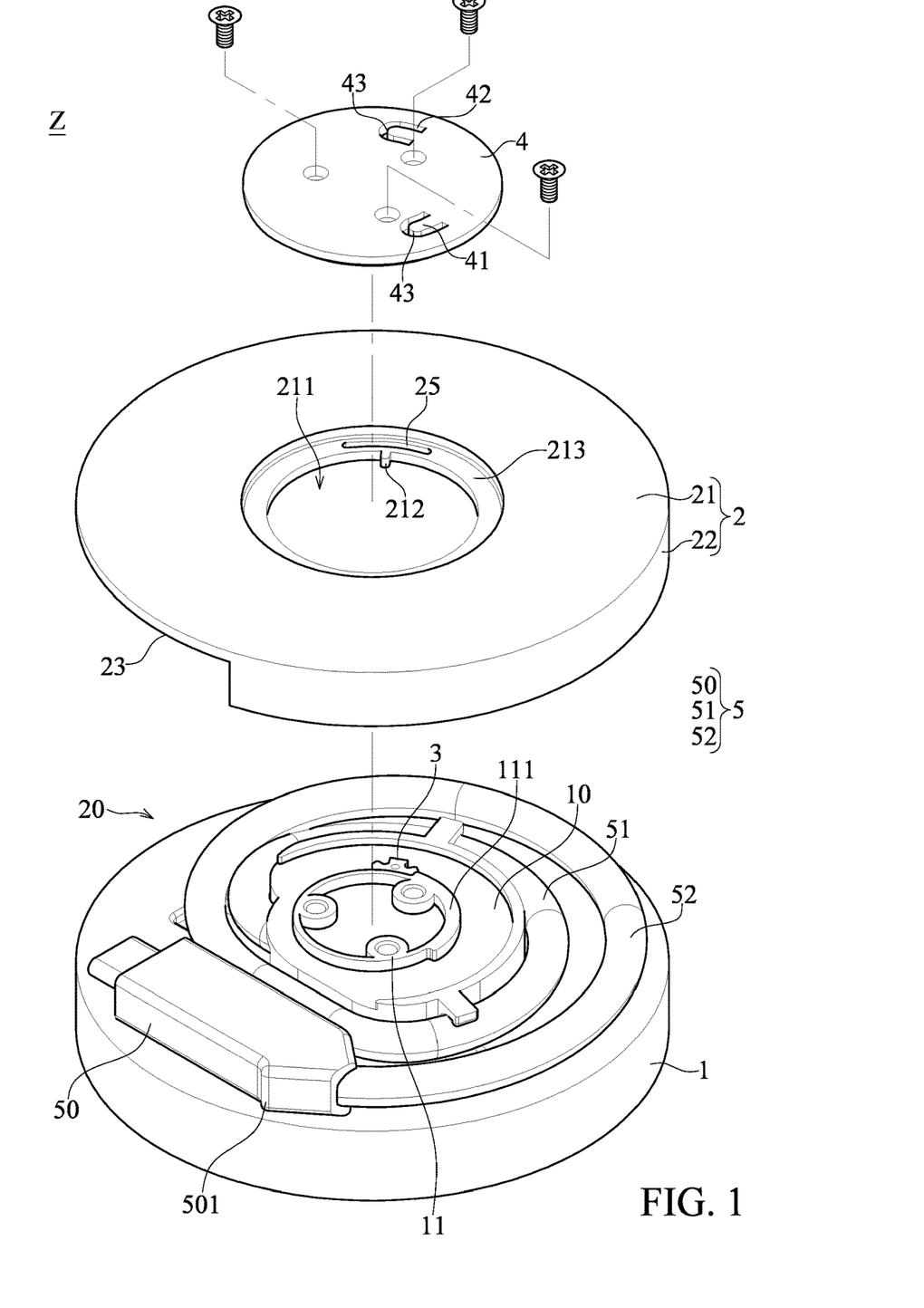
FIG. 1 is a schematic exploded view of a wire retracting device in an embodiment of the present disclosure.

Referring to FIG. 1, a wire retracting device Z that is mainly utilized in a docking station is provided in an embodiment of the present disclosure. The docking station is a dockable device designed for laptop computers, which allows a laptop computer to be connected to peripheral equipment, e.g., a power adapter, an internet cable, a mouse, a peripheral keyboard, a printer, and a peripheral monitor via a single connection point. The wire retracting device Z includes a base 1, a cover 2, a slide block 3, a limiting board 4, and a transmission wire 5. The base 1 can include different types of connecting ports (not shown in the figures), e.g., a high-definition multimedia interface (HDMI) port, a display port (DP), a video graphics array (VGA) port, an Ethernet port, a universal serial bus (USB-C and USB-A), etc.

Figure 2:
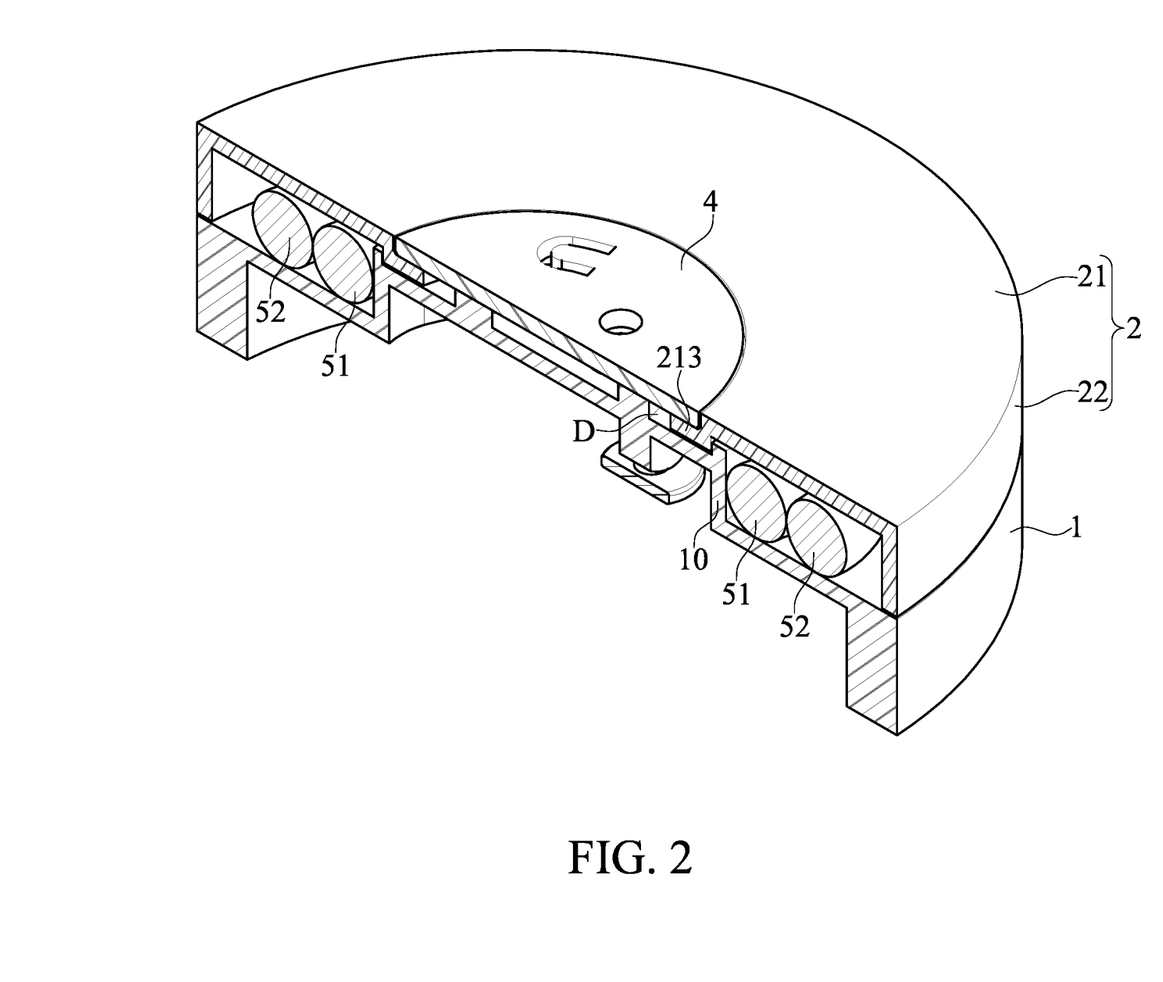
FIG. 2 is a schematic cross-sectional view of the wire retracting device in the embodiment of the present disclosure.
Figure 3:
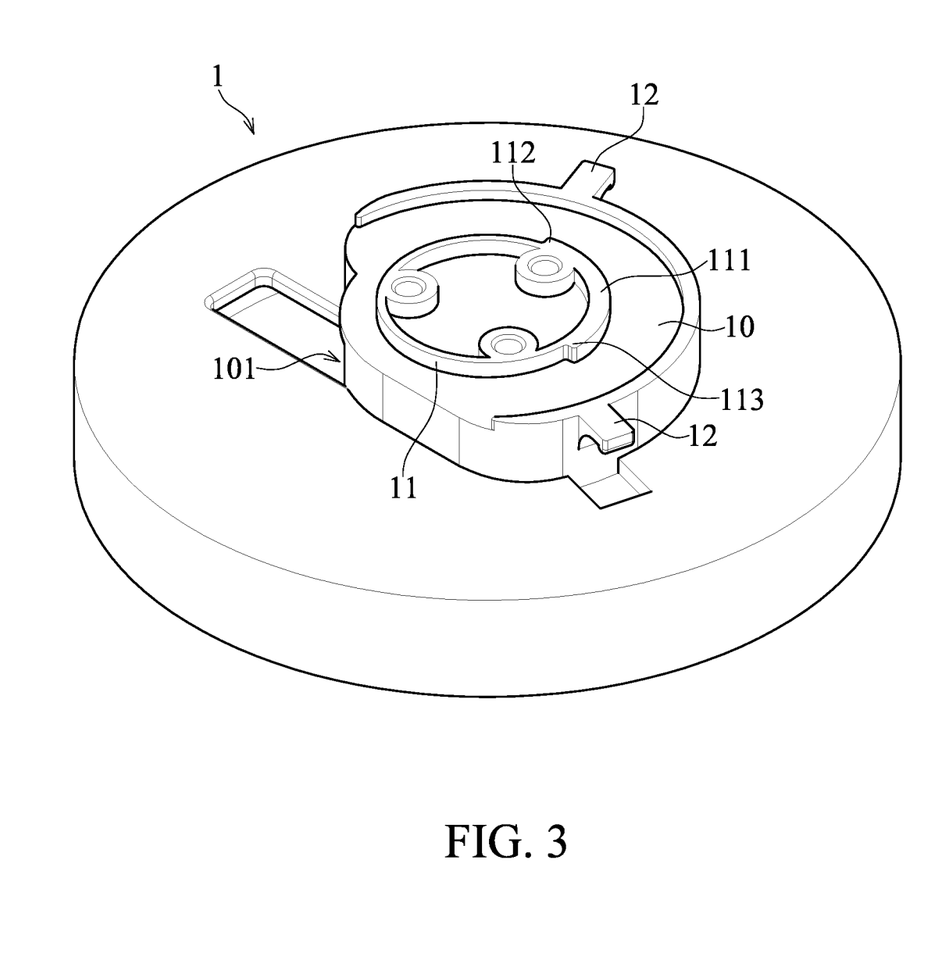
FIG. 3 is a schematic perspective view of a base of the wire retracting device in the embodiment of the present disclosure.

Referring to FIG. 1, FIG. 2, and FIG. 3, the base 1 has a platform 10. An annular wall 11 is arranged on the platform 10. The annular wall 11 has a limiting portion 111. A first stop portion 112 is formed between the annular wall 11 and one of two sides of the limiting portion 111, and a second stop portion 113 is formed between the annular wall 11 and another one of the two sides of the limiting portion 111. The platform 10 includes a wire fastener 12 arranged on a side of the platform 10. The quantity of the wire fastener 12 can be adjusted according to structural requirements. The wire retracting device Z in this embodiment is exemplified as having two wire fasteners 12, but the present disclosure is not limited thereto. In addition, a fixed distance is defined between the two wire fasteners 12, the fixed distance can be adjusted according to structural requirements, and the present disclosure is not limited thereto. A wire outlet 101 is formed on a side of the base 1. An end of a transmission wire 5 is affixed to the base 1, and the transmission wire 5 penetrates through the wire outlet 101. The limiting board 4 is arranged on the base 1, and a gap D is formed between the limiting board 4 and the platform 10. The cover 2 is limited to being movable in the gap D. An accommodating space 20 is formed between the cover 2 and the base 1. When the transmission wire 5 is arranged in the accommodating space 20, the transmission wire 5 is arranged to be wound into a coil on the base 1 by surrounding the platform 10.

Furthermore, the transmission wire 5 surrounds the platform 10 to form a first coil portion 51 and a second coil portion 52, and the first coil portion 51 is positioned between the second coil portion 52 and the platform 10. In other words, the first coil portion 51 is positioned on a relatively inner side and is adjacent to the platform 10 of the wire retracting device Z, such that the first coil portion 51 is affixed by the wire fastener 12 on the side of the platform 10. The second coil portion 52 is positioned on a relatively outer side of the wire retracting device Z.

Figure 4:
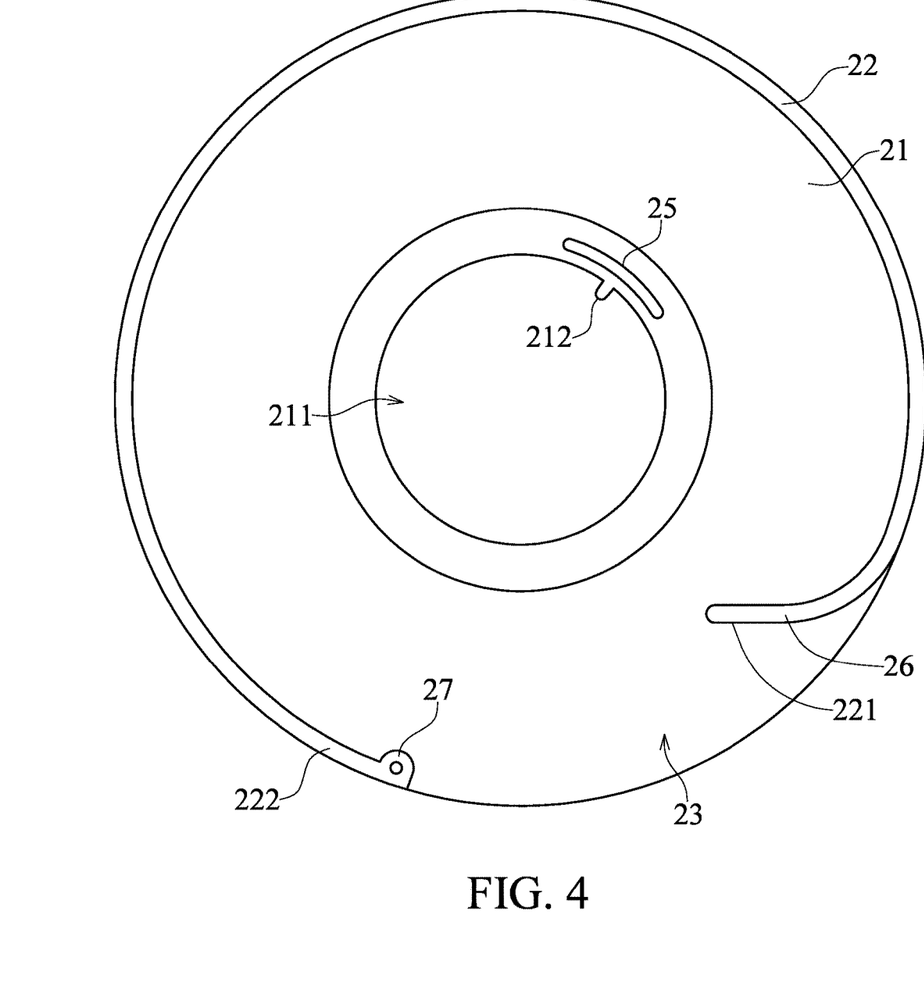
FIG. 4 is a schematic bottom view of a cover of the wire retracting device in the embodiment of the present disclosure.

Referring to FIG. 1 and FIG. 4, the cover 2 includes a top surface 21 and a side wall 22. The top surface 21 has a grooved opening 211. A lever 212 is disposed on an inner edge of the grooved opening 211. In addition, the top surface 21 further includes a strip-shaped through hole 25 which is formed on an edge of the grooved opening 211 and adjacent to the lever 212.

The side wall 22 is arranged along an edge of the top surface 21 and forms an opening 23. The transmission wire 5 can be retracted in and released out through the opening 23. Specifically, the opening 23 is communicated with the accommodating space 20, so as to provide for the transmission wire 5 inside the accommodating space 20 to be released out, or for the transmission wire 5 outside the accommodating space 20 to be retracted in.

Furthermore, the side wall 22 has a first end 221 and a second end 222. The first end 221 extends inwardly to form a bent part 26 when the side wall 22 is arranged along the edge of the top surface 21, and the second end 222 forms a guiding part 27. The top surface 21 of the cover 2 further has a recessed area 213, and the recessed area 213 is adjacent to and surrounds the grooved opening 211. Since the gap D is formed between the limiting board 4 and the platform 10 of the base 1, the recessed area 213 of the cover 2 is positioned in the gap D. Therefore, the gap D enables the cover 2 to rotate freely while being sandwiched between the base 1 and the limiting board 4.

In addition, the transmission wire 5 includes a transmission wire head 50, and the transmission wire head 50 includes an engaging portion 501. When the cover 2 rotates clockwise and drives the guiding part 27 to retract the transmission wire 5 into the accommodating space 20, so that the transmission wire 5 to be wound into a coil on the base 1 by surrounding the platform 10, the transmission wire head 50 is affixed to the guiding part 27 by the engaging portion 501. In this embodiment, the guiding part 27 is a column structure or a roller structure, and the engaging portion 501 is a protruding structure, but the present disclosure is not limited thereto. In other embodiments, the engaging portion 501 can also be a groove structure, or any other engaging structure corresponding to the shape of the guiding part 27.

Figure 5:
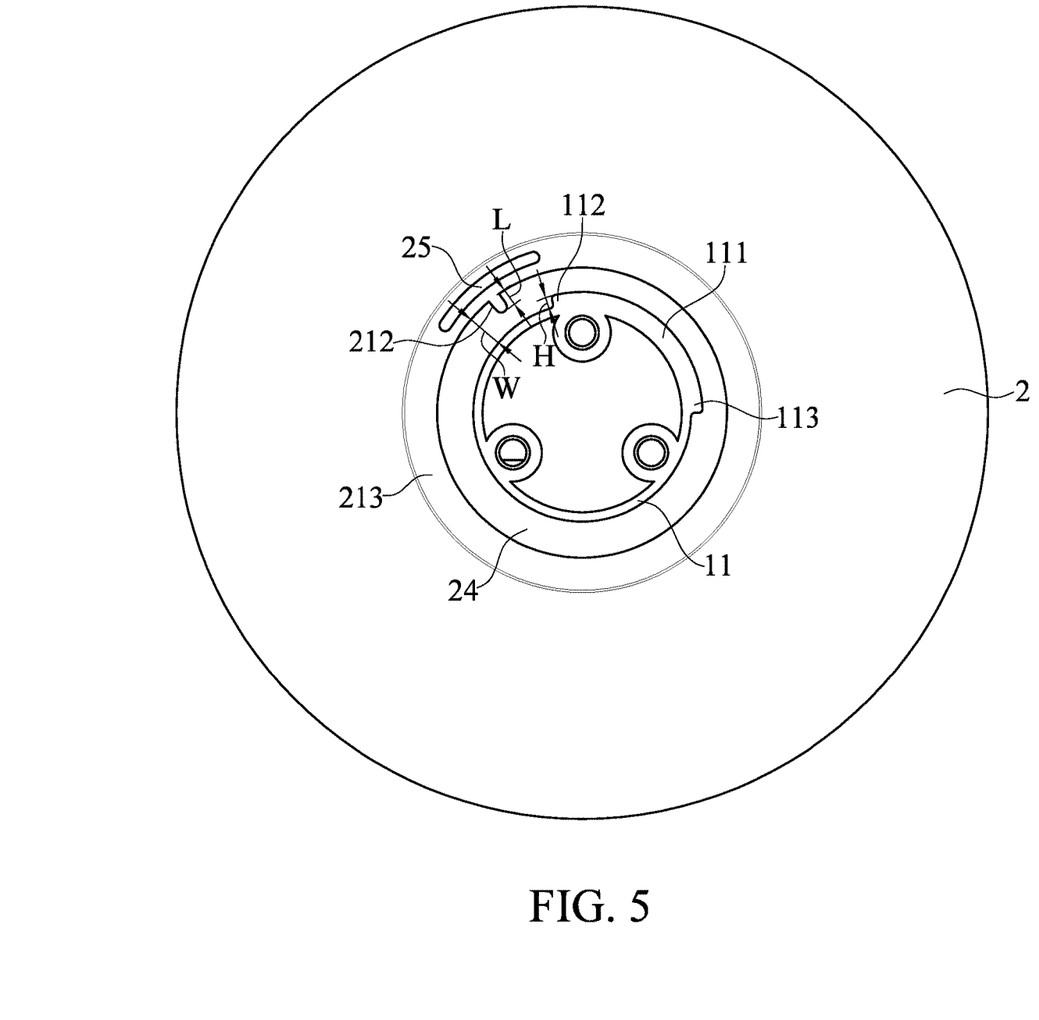
FIG. 5 is a schematic view of a lever and a limiting portion of the wire retracting device at a sliding area in the embodiment of the present disclosure.

Referring to FIG. 5, when the cover 2 is disposed on the base 1, a sliding area 24 is formed between the grooved opening 211 and the annular wall 11. More specifically, the sliding area 24 is formed between the inner edge of the grooved opening 211 and the annular wall 11, and the sliding area 24 is a track. It should be noted that, in this embodiment, the summation of a length L of the lever 212 and a height H of the limiting portion 111 is less than a width W of the sliding area 24. Therefore, when the cover 2 rotates, the lever 212 is not blocked or restricted by the first stop portion 112 and the second stop portion 113.

Figure 6:
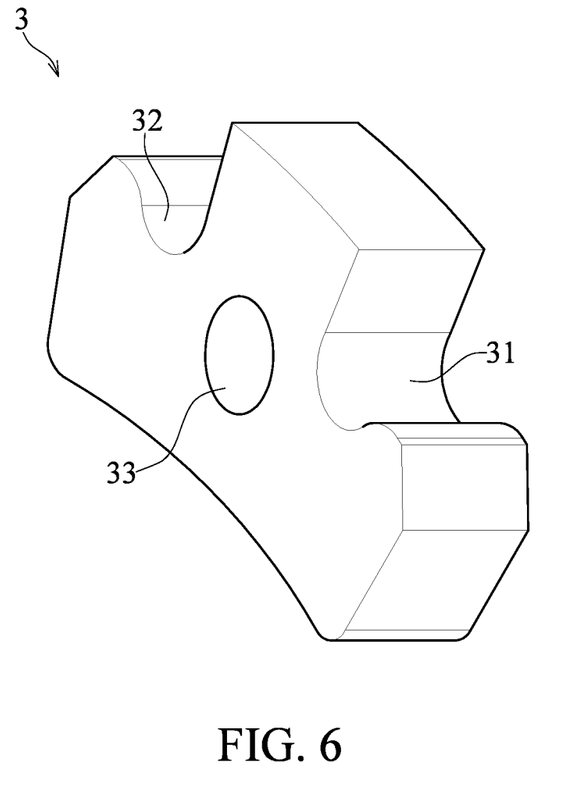
FIG. 6 is a schematic perspective view of a slide block of the wire retracting device in the embodiment of the present disclosure.

Referring to FIG. 5 and FIG. 6, the slide block 3 is slidably disposed in the sliding area 24 and moves along the sliding area 24. The slide block 3 includes a first recess portion 31 and a second recess portion 32, and the first recess portion 31 and the second recess portion 32 are disposed corresponding to the first stop portion 112 and the second stop portion 113, respectively. The shapes of the first recess portion 31 and the second recess portion 32 correspond to that of the lever 212, so as to allow the first recess portion 31 and the second recess portion 32 to be detachably engaged with the lever 212.

References are further made to FIG. 1 and FIG. 5, when the cover 2 is disposed on the base 1, the limiting board 4 is further disposed on the grooved opening 211, such that the cover 2 is sandwiched between the base 1 and the limiting board 4. Specifically speaking, the limiting board 4 is disposed on the grooved opening 211 and affixed to the platform 10 of the base 1. The limiting board 4 and the platform 10A can be fixedly engaged with each other by a plurality of fasteners (for example, but not limited to, screws). The top surface 20 of the cover 2 further has a recessed area 213 (as shown in FIG. 5), and the recessed area 213 is adjacent to and surrounds the grooved opening 211. Therefore, when the limiting board 4 is disposed on the grooved opening 211, an outer side of the limiting board 4 covers the recessed area 213. In this embodiment, a height difference between a bottom of the recessed area 213 and the top surface 20 of the cover 2 equals to a thickness of the limiting board 4. Therefore, when the limiting board 4 is disposed on the grooved opening 211, an upper surface of the limiting board 4 is aligned with the top surface 20 of the cover 2.

Figure 7:
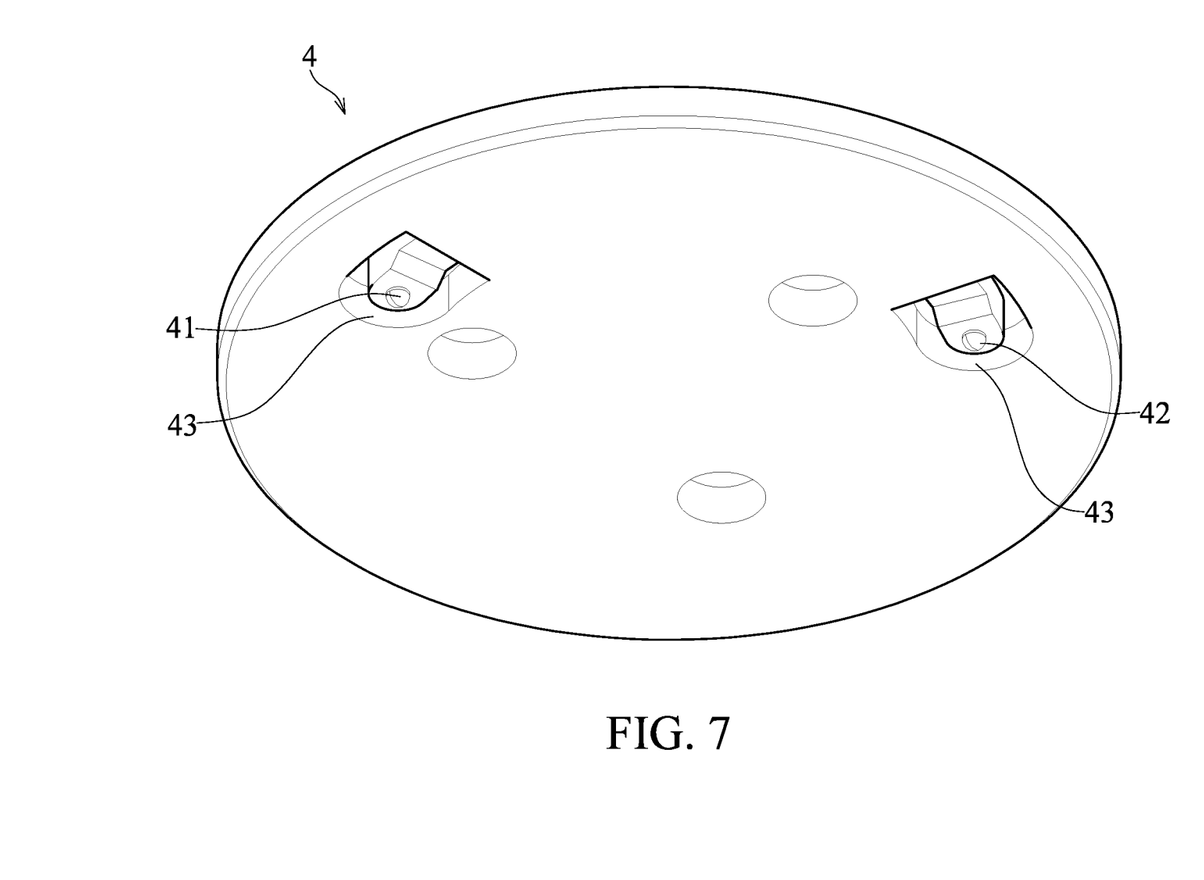
FIG. 7 is a schematic perspective view of a limiting board of the wire retracting device in the embodiment of the present disclosure.

Referring to FIG. 7, the limiting board 4 includes a first positioning portion 41 and a second positioning portion 42, and the first positioning portion 41 and the second positioning portion 42 are symmetrically arranged. The slide block 3 further includes a positioning hole 33. The size and the shape of the positioning hole 33 correspond to the size and the shape of the first positioning portion 41 and the second positioning portion 42. In addition, the positioning hole 33 is detachably engaged with the first positioning portion 41 and the second positioning portion 42. Moreover, a U-shaped through hole 43 is formed around the first positioning portion 41 and the second positioning portion 42. The U-shaped through hole 43 is formed by hollowing out the area surrounding the first positioning portion 41 and the second positioning portion 42 in a way that allows the first positioning portion 41 and the second positioning portion 42 to be respectively connected to the limiting board 4 on one side only. The U-shaped through hole 43 enables the first positioning portion 41 and the second positioning portion 42 to be elastic when being engaged in the positioning hole 33 or being disengaged from the positioning hole 33. Therefore, the first positioning portion 41 and the second positioning portion 42 can avoid damage from being repeatedly engaged with and disengaged from each other. The first positioning portion 41 and the second positioning portion 42 can be any structure with elastic arms, and are not limited to plastic materials.

Next, a retracting movement and a releasing movement of the wire retracting device Z provided by the present disclosure are described as follows. Referring to FIG. 8 to FIG. 13, it should be noted that, for the figures to be clear and concise and for ease of illustration, the transmission wire 5 is not shown therein. In FIG. 8 to FIG. 13, relative positions of the slide block 3 with respect to the lever 212, the limiting portion 111, the first positioning portion 41, and the second positioning portion 42 in the sliding area 24 are illustrated, so as to describe the retracting movement and the releasing movement of the transmission wire 5.

Figure 8:
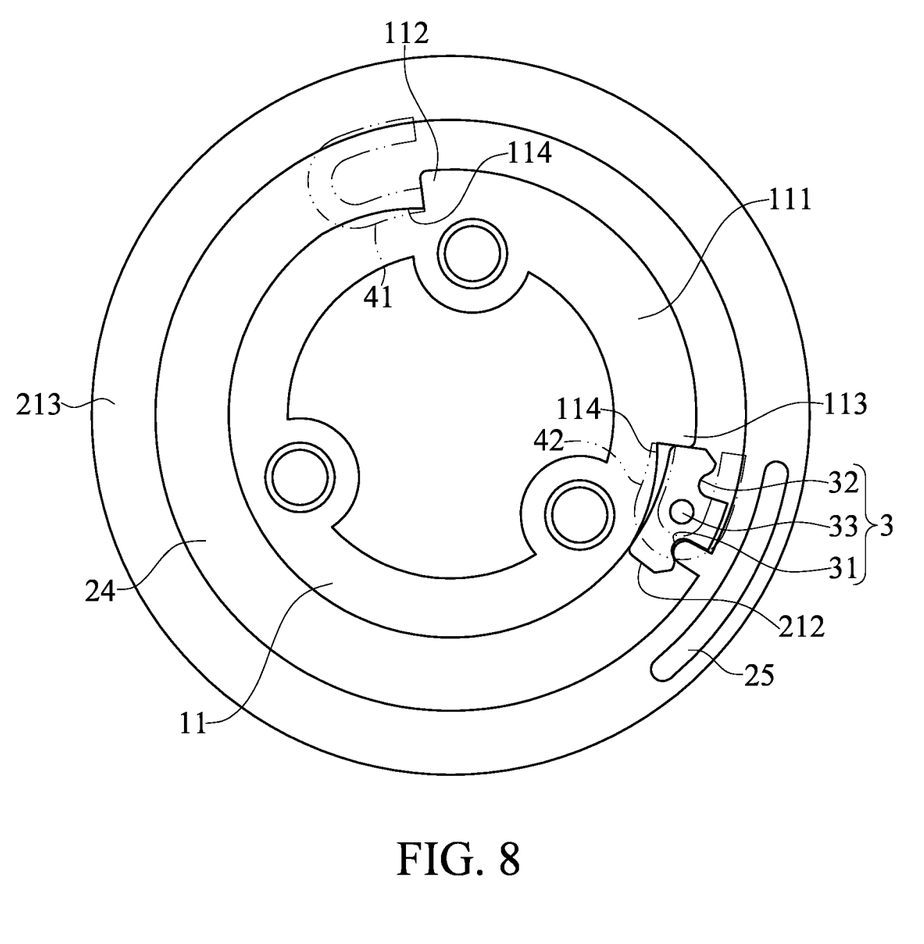
FIG. 8 to FIG. 13 are schematic views showing movements of the wire retracting device in the embodiment of the present disclosure.

Firstly, what is shown in FIG. 8 is a state where the transmission wire 5 is fully extended. At this time, the slide block 3 is restricted by the second stop portion 113 and cannot move counterclockwise, the positioning hole 33 of the slide block 3 is engaged with the second positioning portion 42 of the limiting board 4, and the lever 212 of the cover 2 is engagingly disposed in the first recess 31. The first recess 31 is engaged with the lever 212, such that the cover 2 is in a pseudo-fixed state. In addition, as shown in FIG. 8, a notch structure 114 is formed at a junction between the limiting portion 111 and the first stop portion 112 and a junction between the limiting portion 111 and the second stop portion 113, respectively.

Figure 9:
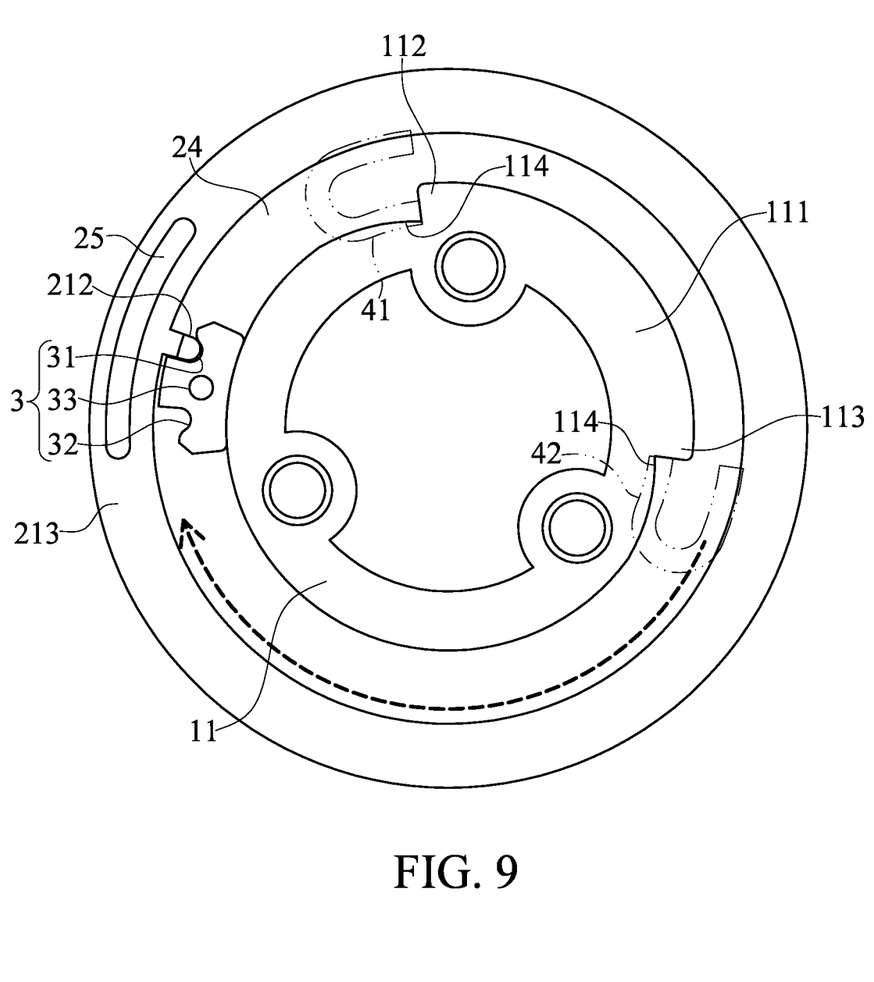

Next, as shown in FIG. 9, a user can rotate the cover 2 to start the wire retracting movement, such that the cover 2 is subject to a force to rotate clockwise. At this time, since an engaging force between the slide block 3 and the lever 212 (i.e., the first recess 31 being engaged with the lever 212) is relatively greater, the lever 212 drives the slide block 3 to detach from the second positioning portion 42 of the limiting board 4. Furthermore, the slide block 3 that is disengaged from the second positioning portion 42 rotates clockwise along the sliding area 24 (i.e., the direction of a dotted arrow shown in FIG. 9).

Figure 10:
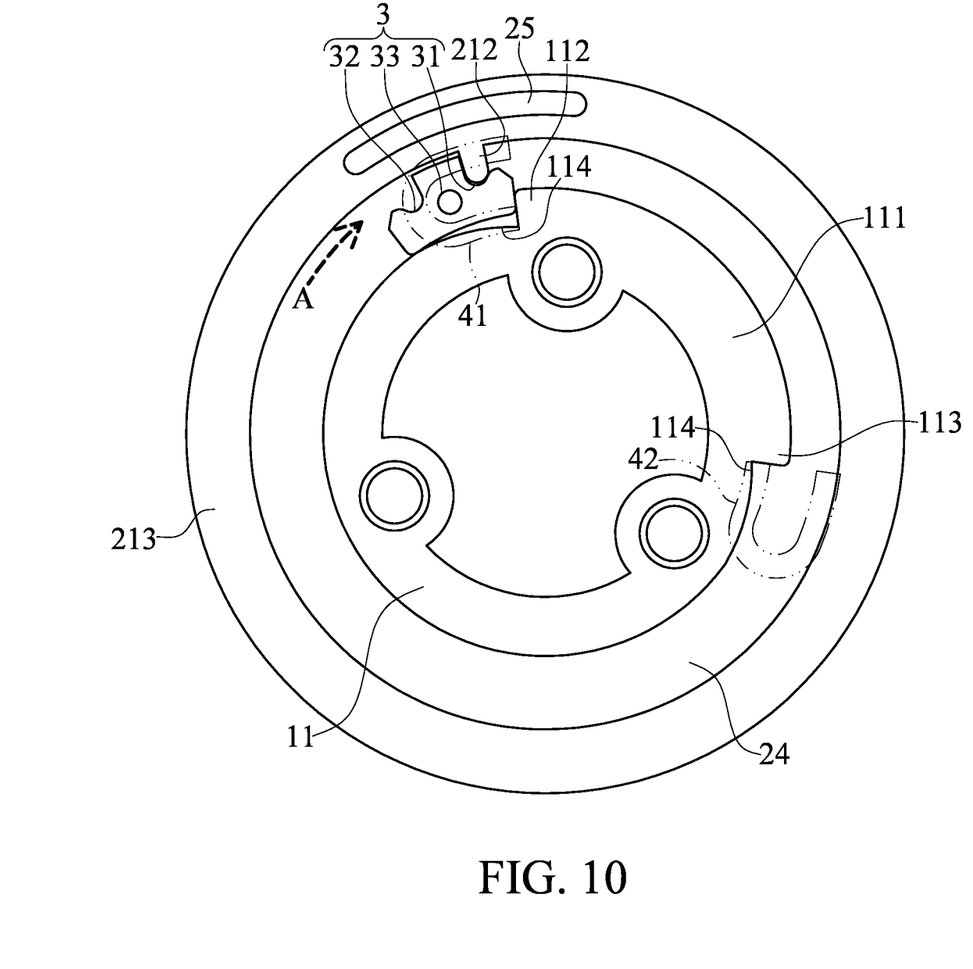

Next, as shown in FIG. 10, the lever 212 drives the slide block 3 to rotate continuously along the sliding area 24 (i.e., the direction of the arrow A shown in FIG. 10) until the slide block 3 abuts against the first stop portion 112. At this time, the positioning hole 33 of the slide block 3 is engaged with the first positioning portion 41 of the limiting board 4, thus completing the retracting movement of a first coil of the transmission wire 5.

Figure 11:
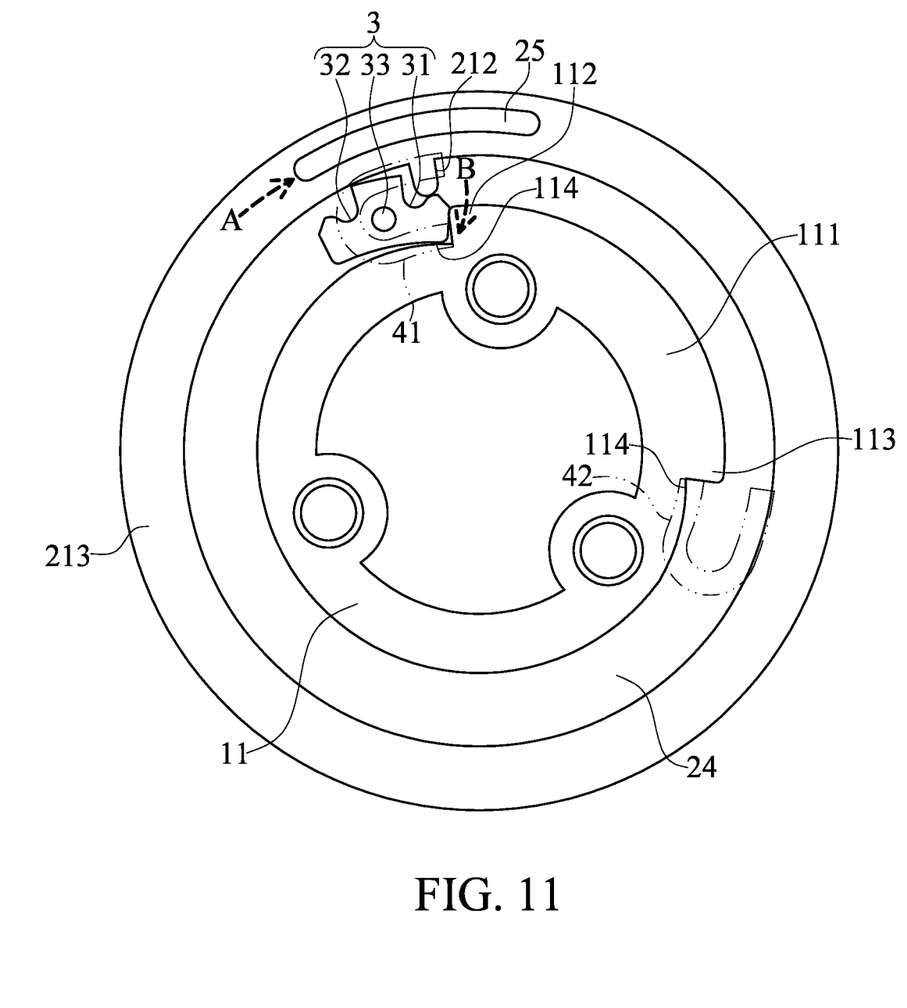

Next, as shown in FIG. 11, the slide block 3 is blocked and then stopped by the first stop portion 112. However, due to the direction of inertia (as indicated by the arrow A) generated when rotating clockwise, the slide block 3 is slightly rotated for a certain angle (as indicated by the arrow B) by the notch structure 114. The rotation angle allows the lever 212 to detach from the slide block 3 and continue rotating. As mentioned above, the summation of the length L of the lever 212 and the height H of the limiting portion 111 is less than the width W of the sliding area 24. Therefore, when the cover 2 rotates, the lever 212 is not blocked or restricted by the first stop portion 112 and the second stop portion 113. Therefore, the lever 212 is able to detach from the slide block 3 and continues rotating.

It is worth mentioning that, in addition to the notch structure 114, the strip-shaped through hole 25 also contributes to the ability of the lever 212 to be disengaged from the slide block 3. The strip-shaped through hole 25 is formed at the edge of the grooved opening 211 and adjacent to the lever 212. The strip-shaped through hole 25 allows the lever 212 to have an elastic space for pushing outwardly. Therefore, when the lever 212 is to be disengaged from the slide block 3, the slide block 3 is first rotated for a certain angle due to the notch structure 114, and together with the elastic space formed by the strip-shaped through hole 25, the lever 212 is allowed to be disengaged from the slide block 3 smoothly.

Figure 12:
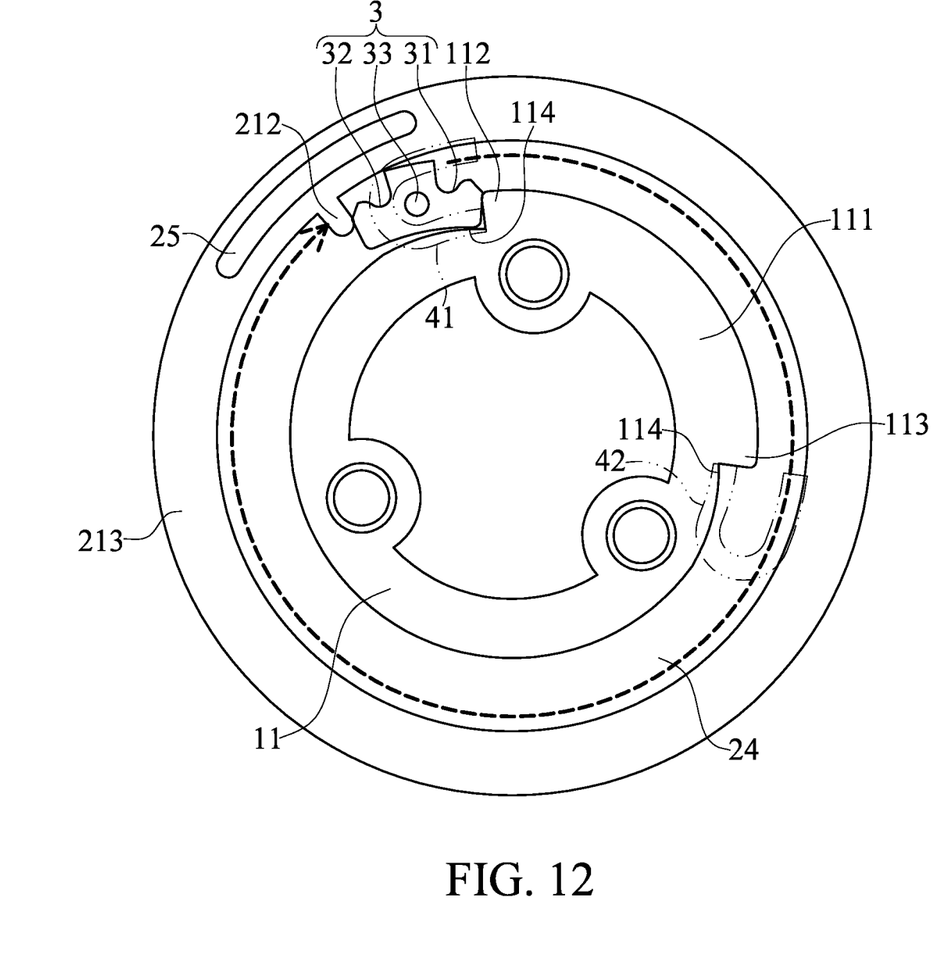
Figure 13:
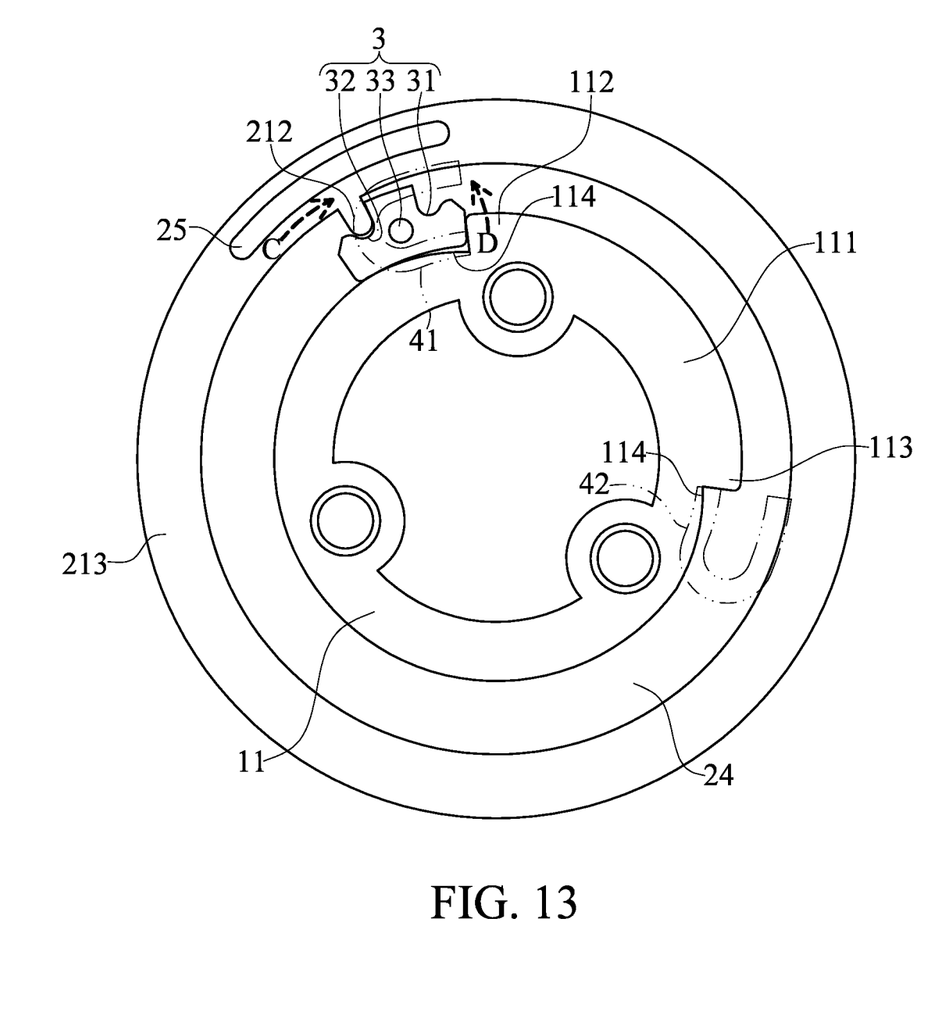

Next, as shown in FIG. 12 and FIG. 13, after the lever 212 is disengaged from the slide block 3, the lever 212 continues to rotate for 360 degrees along the sliding area 24 to the other side of the slide block 3. It should be noted that surfaces of protruding portions on both sides of the slide block 3 are actually inclined, which allows the lever 212 to be engaged with the second recess portion 32 of the slide block 3 through the rotational inertia and the elastic space of the strip-shaped through hole 25, such that the wire retracting movement of a second coil of the transmission wire 5 is completed, and that the cover 2 is in the pseudo-fixed state again.

In addition, the action sequence and the principle of the wire releasing movement of the wire retracting device Z are the same as those of the wire retracting movement, except that a rotational direction of the wire releasing movement is reversed. When the user wishes to release the transmission wire 5, the user can rotate the cover 2 counterclockwise. At this time, the cover 2 is subject to a force to rotate counterclockwise, so that the lever 212 drives the slide block 3 to be disengaged from the first positioning portion 41 of the limiting board 4. The lever 212 and the slide block 3 then rotates counterclockwise together until being blocked and stopped by the second stop portion 113. The slide block 3 is slightly rotated for a certain angle due to the notch structure 114, and the rotation angle allows the lever 212 to be disengaged from the slide block 3 and continues to rotate until the transmission wire 5 is completely released from the accommodating space 20, thus completing the releasing movement of the transmission wire 5.

Beneficial Effects of the Embodiment

One of the beneficial effects of the wire retracting device Z of the present disclosure is that, by virtue of "the wire retracting device Z including the base 1, the cover 2, the slide block 3, the limiting board 4, and the transmission wire 5", "the base 1 including the platform 10, the annular wall 11 being arranged on the platform 10, the annular wall 11 having the limiting portion 111, and the first stop portion 112 and the second stop portion 113 being formed on two sides of the limiting portion 111, respectively", "the limiting board 4 being disposed on the base 1, the gap D being formed between the limiting board 4 and the platform 10 the cover 2 being limited to being movable in the gap D, and the accommodating space 20 being formed between the cover 2 and the base 1", "the cover 2 including the top surface 21 and the side wall 22, the top surface 21 having the grooved opening 211, the lever 212 being arranged on the inner edge of the grooved opening 211, and the side wall 22 being disposed along the edge of the top surface 21 and forming the opening 23", "the sliding area 24 being formed between the inner edge of the grooved opening 211 and the annular wall 11", "the slide block 23 being slidably disposed on the sliding area 24, the slide block 23 including the first recess portion 31 and the second recess portion 32, the first recess portion 31 and the second recess portion 32 being disposed symmetrically, and the lever 212 being detachably engaged with the first recess portion 31 and the second recess portion 32", "the limiting board 4 being disposed on the grooved opening 211 and affixed on the annular wall 11 of the platform 10", and "the transmission wire 5 being disposed in the accommodating space 20, and the transmission wire 5 being capable of being retracted in and being released out through the opening 23", a retractable length of the transmission wire 5 can be increased, and the user is able to be aware that the retracting movement of has been completed when a wire (i.e., the transmission wire 5) is wound for more than one turn. In this way, the wire can be prevented from being damaged due to being over-wound.

Furthermore, the wire retracting device Z of the present disclosure is a mechanism of a movable stopping point formed by the slide block 3, the first stop portion 112, and the second stop portion 113, which is able to provide stopping points even when the transmission wire 5 is wound multiple turns. Moreover, in the wire retracting device Z of the present disclosure, the lever 212 of the cover 2 is engaged with the first recess 31 or the second recess 32 to form a pseudo-fixed state, such that the user feels a pause when the wire retracting device Z is retracting or releasing the transmission wire 5, so as to be made aware of the releasing or retracting state of the transmission wire 5. In addition, the pseudo-fixed state also prevents a spring-back problem caused by the tension of the transmission wire 5.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wire retracting device, comprising:
   a base including a platform, an annular wall being arranged on the platform, the annular wall having a limiting portion, and a first stop portion and a second stop portion being formed on two sides of the limiting portion, respectively;
   a limiting board disposed on the base, a gap being formed between the limiting board and the platform;
   a cover limited to being movable in the gap, an accommodating space being formed between the cover and the base, wherein the cover includes a top surface and a side wall, the top surface has a grooved opening, a lever is arranged on an inner edge of the grooved opening, the side wall is disposed along an edge of the top surface and forms an opening, and a sliding area is formed between the inner edge of the grooved opening and the annular wall;

a slide block slidably disposed on the sliding area, the slide block including a first recess portion and a second recess portion, the first recess portion and the second recess portion being disposed symmetrically, and the lever being detachably engaged with the first recess portion and the second recess portion; and a transmission wire disposed in the accommodating space, the transmission wire capable of being retracted in and being released out through the opening.

2. The wire retracting device according to claim 1, wherein the platform further includes at least one wire fastener disposed on a side of the platform, and when the transmission wire surroundingly forms a first coil portion and a second coil portion around the platform, the first coil portion is affixed by the at least one wire fastener.

3. The wire retracting device according to claim 1, wherein the limiting board includes a first positioning portion and a second positioning portion, the first positioning portion and the second positioning portion are disposed corresponding to the first stop portion and the second stop portion, respectively, the slide block further includes a positioning hole, and the positioning hole is detachably engaged with the first positioning portion and the second positioning portion.

4. The wire retracting device according to claim 1, wherein a summation of a length of the lever and a height of the limiting portion is less than a width of the sliding area.

5. The wire retracting device according to claim 1, wherein a grooved opening structure is formed at a junction between the annular wall and the first stop portion, and at a junction between the annular wall and the second stop portion, respectively.

6. The wire retracting device according to claim 1, wherein the top surface further includes a strip-shaped through hole, and the strip-shaped through hole is formed on an edge of the grooved opening and adjacent to the lever.

7. The wire retracting device according to claim 1, wherein the side wall further includes a first end and a second end, the first end is bent inwardly to form a bent part, and the second end forms a guiding part.

8. The wire retracting device according to claim 7, wherein the transmission wire further includes a transmission wire head, the transmission wire head has an engaging portion, and the transmission wire head is affixed to the guiding part by the engaging portion.

9. The wire retracting device according to claim 8, wherein the guiding part is a column structure or a roller structure.

10. The wire retracting device according to claim 9, wherein the engaging portion is a protrusion or a recess, and a shape of the engaging portion corresponds to that of the guiding part.

* * * * *